US007990425B2

(12) United States Patent
Klijn et al.

(10) Patent No.: US 7,990,425 B2
(45) Date of Patent: Aug. 2, 2011

(54) IMAGE DATA PROCESSING APPARATUS WITH IMAGE PICKUP MEANS

(75) Inventors: Jan Klijn, Breda (NL); Johan Schirris, Veldhoven (DE); Piet Dielhof, Balen (BE)

(73) Assignee: Robert Bosch GmbH, Stuttgart (DE)

( * ) Notice: Subject to any disclaimer, the term of this patent is extended or adjusted under 35 U.S.C. 154(b) by 455 days.

(21) Appl. No.: 11/995,147

(22) PCT Filed: Sep. 19, 2005

(86) PCT No.: PCT/EP2005/054662
§ 371 (c)(1), (2), (4) Date: Jan. 9, 2008

(87) PCT Pub. No.: WO2007/038977
PCT Pub. Date: Apr. 12, 2007

(65) Prior Publication Data

US 2008/0218599 A1 Sep. 11, 2008

(51) Int. Cl.
*H04N 5/228* (2006.01)
*H04N 5/235* (2006.01)
*H04N 5/20* (2006.01)

(52) U.S. Cl. ................... 348/221.1; 348/229.1; 348/255

(58) Field of Classification Search ........................ None
See application file for complete search history.

(56) References Cited

U.S. PATENT DOCUMENTS 4,647,975 A * 3/1987 Alston et al. ............... 348/222.1
2004/0207734 A1 10/2004 Horiuchi

FOREIGN PATENT DOCUMENTS

EP 0910209 * 10/1998
EP 0 910 209 4/1999
EP 1 117 252 7/2001
EP 1545123 * 9/2003
EP 1 545 123 6/2005

OTHER PUBLICATIONS

Tomoo Mitsunaga et al: "Radiometric Self Calibration" Proceedings of the 1999 IEEE, Computer Society Conference on Computer Vision and Pattern Recognition, Jun. 23-25, 1999, Fort Collins, Colorado, IEEE, The Institute of Electrical and Electronics Engineering, Inc., US vol. 1, Jun. 23, 1999, pp. 374-380 (in English).

* cited by examiner

*Primary Examiner* — Lin Ye
*Assistant Examiner* — Euel K Cowan
(74) *Attorney, Agent, or Firm* — Michael J. Striker

(57) ABSTRACT

The invention relates to an image pickup apparatus (70) comprising an image pickup means (700) for forming a plurality of image signals (S,L) having different exposure conditions, combining means for combining said plurality of image signals (L,S) to form a combined image signal having an extended dynamic range, further comprising display and/or recording means (701) for displaying and/or recording said combined image signal, further comprising a function module (79) correcting at least one of the image signals (L,S) in order to achieve a smooth transition between the image signals (S, L) at a transition point.

12 Claims, 3 Drawing Sheets

IMAGE DATA PROCESSING APPARATUS WITH IMAGE PICKUP MEANS

CROSS-REFERENCE

The invention described and claimed hereinbelow is also described in PCT/EP2005/054662, filed on Sep. 19, 2005. This Patent Application, whose subject matter is incorporated here by reference, provides the basis for a claim of priority of invention under 35 U.S.C. 119 (a)-(d).

BACKGROUND OF THE INVENTION

The present invention relates to an image pickup apparatus which enlarges the dynamic range of image data to be processed. Furthermore the present invention relates to a method of processing image data with a large dynamic range.

The dynamic range of an image signal generated by an image sensor in CCD- or CMOS-technology is limited by its noise level on the one hand, and the saturation voltage on the other hand. For a CCD-sensor typically a dynamic range of 74 dB can be obtained which is sufficient for most applications. For applications with a very large contrast ratio, however, e.g. where outdoor scenes with bright sunlight are involved, a greater dynamic range is required in order to obtain images of a satisfactory quality. For example the contrast ratio in a sunny outdoor scene can be as high as 1000× (60 dB). For the lowest level in that scene the signal to noise ratio (SNR) needs to be 40 dB in order to achieve an acceptable quality. Therefore the total dynamic range should be about 100 dB. There were already some solutions proposed in literature to achieve this goal. A very popular idea known from the state of the art (U.S. Pat. No. 4,647,975 A1) is a double exposure solution where two pictures are taken with a short time interval in between. One picture is taken with a short exposure time and the second picture is taken with a longer exposure time. Combining the two pictures results in a good SNR in the dark parts of the picture due to the long exposure time of the second picture. In addition there is almost no saturation in the bright parts of the picture due to the first picture taken with a short exposure time. The ratio of the exposure times varies from 4 to 32.

SUMMARY OF THE INVENTION

The present invention has been made in consideration of the above situation, and has as its object to provide an image data processing apparatus which obtains high-quality image data with an enlarged dynamic range.

This object is achieved by an image pickup apparatus comprising an image pickup means for forming a plurality of image signals having different exposure conditions, combining means for combining said plurality of image signals to form a combined image signal having an extended dynamic range, further comprising display and/or recording means for displaying and/or recording said combined image signal, further comprising a function module correcting at least one of the image signals in order to achieve a smooth transition between the image signals at a transition point between the image signals.

Furthermore additional function modules are provided, said additional function modules deriving parameters from signal samples of the said image signals and feeding these parameters as correction factors into the first function module mentioned above.

In a first embodiment of the invention said signal samples are taken from the image signals available at the output of a sensor transforming optical signals into electrical signals.

In a further preferred embodiment of the invention said signal samples are taken from a first image signal available at the output of the said sensor, and from a third image signal, which is derived from a second output signal of said sensor by multiplying this second signal with the ratio of the exposure times used for generating said image signals. Preferably a CCD device is used as a sensor.

In a preferred embodiment of the invention a smooth transition between the said image signals at a transition point is achieved while using a second order correction function.

In a preferred embodiment of the invention the image pickup apparatus comprises at least two accumulators wherein the first accumulator generates an output derived from the first image signal, and wherein the second accumulator generates an output derived from a third signal wherein this third signal is derived from the second image signal.

In order to easily process the various signals storage means are provided for storing the output signals of the first and second accumulator.

A first preferred method to process an image signal with large dynamic range comprises the steps of forming a plurality of image signals having different exposure conditions with at least one image pickup sensor, correcting at least part of the plurality of image signals with a correction function in order to get a corrected output signal, and combining said plurality of image signals and said corrected output signal to form a combined image signal having an extended dynamic range.

A second preferred method to process an image signal with large dynamic range comprises the steps of forming first image signals with a short exposure time, forming second image signals with a long exposure time, correcting said second image signals formed with a long exposure time by applying a correction function to said second signals in order to provide third corrected signals, and, combining the said first signals and the said third signals to form a combined image signal having an extended dynamic range.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF PREFERRED EMBODIMENTS

Embodiments of the invention are described hereinafter with reference to the drawings. The line graph shown in FIG.

Figure 1:
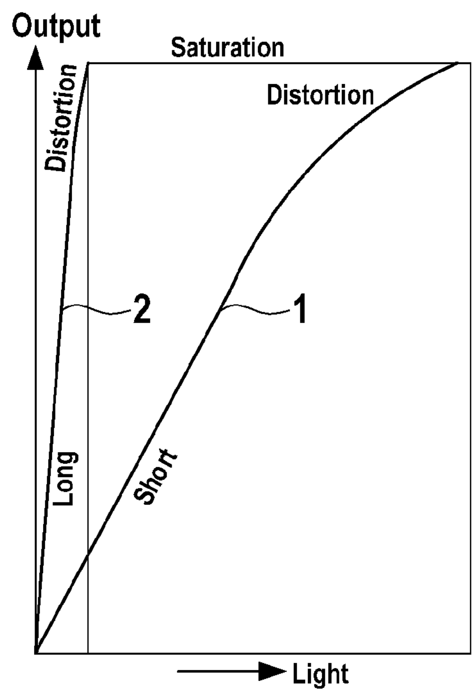
FIG. 1 is a line graph showing image signals as a function of light level for two different exposure times.
Figure 2:
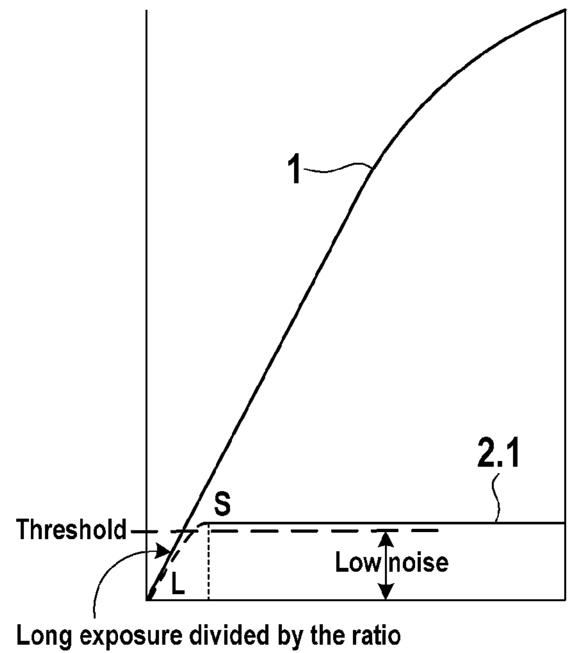
FIG. 2 is a line graph showing image signals as a function of light level. The curve representing a longer exposure time has been processed by a multiplication (applying a factor smaller than 1)

1 shows the functional relation between light level (x-axis) and output signal (y-axis) of an image pickup sensor, especially a CCD-sensor, both of them in arbitrary units. Curve 1 represents the functional relation due to a short exposure time. Curve 2 represents the functional relation due to a long exposure time. Both curves show a linear part before getting distorted and going into saturation. FIG. 2 shows a similar graph after a processing step. During this process the values of the curve 2 are divided by the ratio of the exposure times applied. This results in the curve 2.1 which goes in saturation at rather low values of the light level. Curve 1 representing the functional relation between light level and output signal due to a short exposure time remains unchanged. The combination of the two images is done making use of the following relations:

$$Ldiv = \frac{L}{R} \quad (1)$$

With $$R = \frac{\text{Let}}{\text{Set}} \quad (2)$$

$$\text{if}(S<T)\text{:Out}=L\text{ div} \quad (3)$$

$$\text{else:Out}=S$$

With:

L=Signal of the long exposed image

S=Signal of the short exposed image

T=threshold

Let=long exposure time

Set=short exposure time

Out=combined signal.

Figure 3:
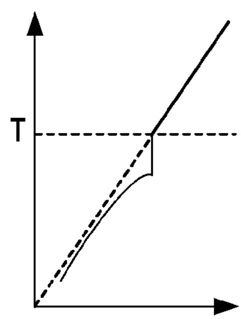
FIGS. 3 to 6 are line graphs illustrating the matching problem occurring at the crossover point.
Figure 4:
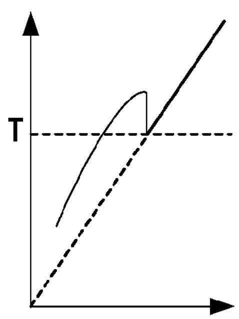
Figure 5:
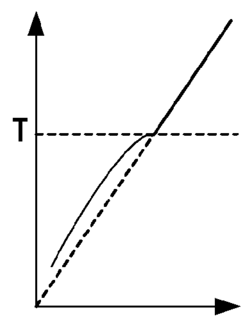
Figure 6:
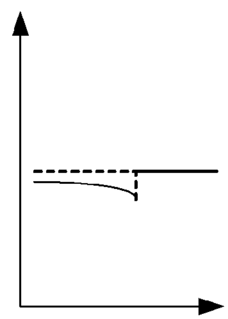

The main problem while combining the two images this way is how to avoid irregularities at or near the crossover point. CCD sensors are combined with colour filters in order to create a colour image. In the output signal of such a CCD sensor consecutive pixels can have different values as they are filtered with a different colour filter. Around the threshold level T this can mean that the output signal of consecutive pixels can originate from a different input S or L (curves 1, 2). As the colour decoding process may use the differences between consecutive or nearby pixels, the irregularities mentioned will create colour errors. Due to the non-linearity of the output signal of the CCD sensor the transfer function is non continuous at the threshold T when using exactly the ratio R to calculate Ldiv (see FIG. 3). However, even when the ratio R is adapted to exactly match S and Ldiv at the threshold T (FIG. 4, FIG. 5); the first derivative remains non continuous (FIG. 6). Most known solutions try to overcome this problem by making a gradual transition over a certain range when going over from Ldiv to S and vice versa instead of switching between the two curves. This method, however, has serious drawbacks. The noise in S (curve 1) is much higher (by a factor R) than in Ldiv (curve 2.1). Using a mixer Ldiv, nearly the whole mixing range would be dominated by the noise of S. Furthermore the range of the mixer would need to be large to really annihilate or avoid distortion. This costs much of the precious low noise Ldiv range. Furthermore the distortion effects are displayed as a 2-line effect due to the different signal amplitudes coming from different optical filters. A mixer would need to be a vertical or 2 D mixer in order to be effective.

Figure 7:
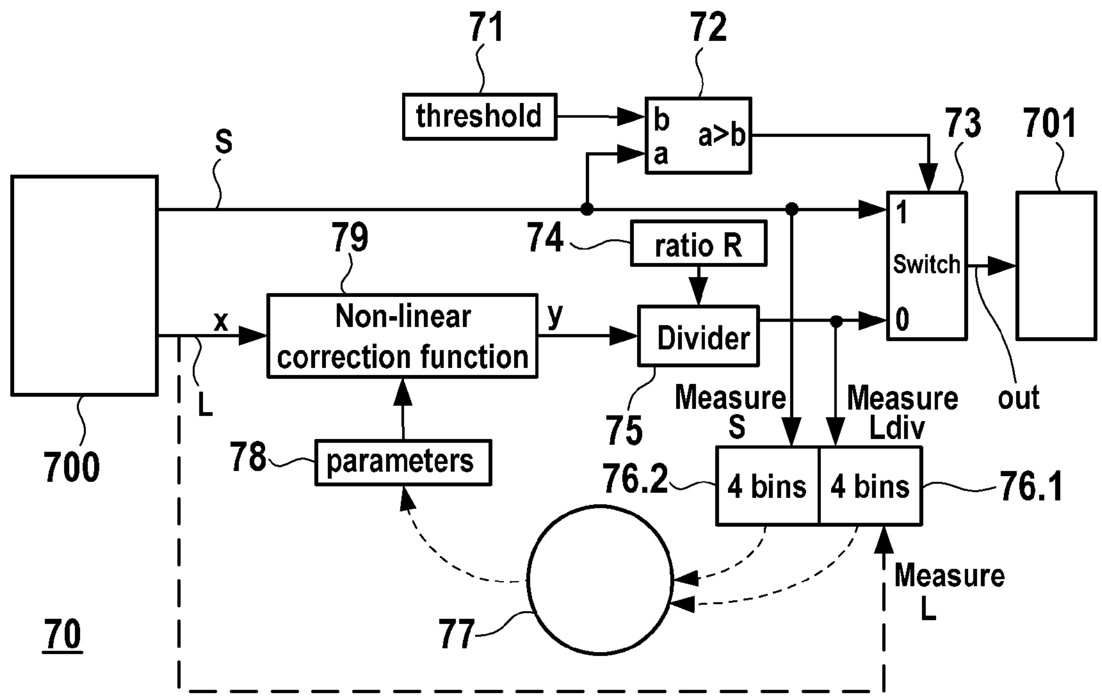
FIG. 7 is a block diagram showing an image pickup apparatus according to the invention.

These drawbacks are overcome by a new image data processing apparatus described herewith in detail with reference to the block diagram shown in FIG. 7.

The apparatus 70 comprises a first function module 71 setting a threshold value T. The first function module 71 is connected to a second function module 72 having two input connections and one output connection. The first input connection of the function module 72 is connected to the output of the function module 71. The second input connection of the function module 72 is connected to a sensor 700 providing image signals S and L. The signal S is provided to the function module 72. The image signal S results from a short exposure whereas the signal L results from a long exposure. The output of the function module 72 is connected to a third function module 73. The signal S is connected to an input connection of this function module 73. The output connection of the function module 73 delivers the combined output signal "Out". The function module 73 is connected to a display and/or recording means 701. A fourth function module 74 sets the ratio R. The function module 74 is connected to a fifth function module 75 whose output connection is connected to an input connection of the function module 73. The output of function module 75 is connected as well to an input connection of a sixth function module 76.1. The input of a seventh function module is connected to a seventh function module 76.2. The output connections of the function modules 76.1 and 76.2 are connected to an eighth function module 77. The output connection of the function module 77 is connected to a ninth function module 78. The output of function module 78 is connected to a tenth function module 79. The signal L is connected to a further input connection of the function module 79. The output connection of the function module 79 is connected to an input connection of the function module 75. The input of function module 79 is connected to the sensor 700 and receives the image signal L.

The function of the apparatus 70 can be best described as follows. The function module 71 sets a threshold T which is input into the function module 72. The function module 72 receives as well the image signal S provided by the sensor 700 at one of its two input connections. The function module 72 compares the threshold value T and the signal S and provides a control signal to function module 73 depending on this comparison. The function module 73 acts as a switch connecting one of its two input connections with its output depending on the control signal provided by the function module 72. If, for instance, the signal S is greater than the threshold value T, an output signal is generated which controls the function module 73 in such a way that the signal S is switched to the output of the function module 73. If, on the other hand, the signal S is lower than the threshold T the signal Ldiv derived from the signal L is switched to the output of the function module 73. The invention provides for a smooth transition at this cross over point. In order to achieve this aim the apparatus 70 comprises a function module 79. The input of this function module is connected to the sensor 700 and receives the image signal L as input signal x. The function module 79 applies a correction function on the image signal L. This correction function is exactly compensating for the non-linear output signal of the CCD sensor 700 in such a way that the resulting transfer function Ldiv (after division of the output signal y by the factor R) is essentially linear and exactly matching the transfer of the image signal S. In a preferred embodiment of the invention a non-linear correction function is selected as follows $$y=x+k_1x^2+k_2(x-p)^2_{x>p} \quad (6)$$

And applied to the input signal x in order to yield the corrected output function y.

With:

$$k_1x^2 \quad (7)$$

A term to compensate the distortion in the CCD sensor due to the increasing charge;

And:

$$k_2(x-p)^2_{x>p} \quad (8)$$

A term to compensate for the saturation of the output stage.

The output signal y available at the output of function module 79 is the input signal for the function module 75. Function module takes care of a division of the signal y by a factor R set by the function module 74. The division yields the signal Ldiv which is available at one input connection of the function module 73 as described already herein above.

The factors $k_1$, $k_2$, and p in the correction function shown in equation (6) above have to be found empirically and must be dynamically adapted as the non-linearity of the CCD sensor 700 is temperature dependent. In order to achieve this image signals S and Ldiv are measured on defined levels according to a first embodiment of the invention (function modules 76.1, 76.2). Alternatively according to a second embodiment the signals S and L are measured. The results of the measurements are taken to function module 77 where curve fitting calculations take place in order to calculate the parameters $k_1$,$k_2$, and p. The parameters are stored in function module 78 and fed into the function module 79 where the correction of the incoming image signal L takes place. Thus, if the image signals S and Ldiv are measured a feedback control loop is formed and the differences between signal samples will become zero when a perfect match has been achieved. If the image signals S and L are measured, a feed forward control is achieved with comparatively good results. In an advantageous embodiment of the invention a feedback loop is made up using 4 measurement bins with a width of 1/64 of the Ldiv range. The values of the pixels falling in the bins are summed over the frame time. The first bin is set at 50% of the range while p is >50% of the range. With this input k1 can be optimized. The second bin is positioned just below, the third bin is positioned exactly at, and the fourth pin is positioned just above the threshold T. When $k_1$ is found and p is fixed, $k_2$ can easily be optimized with the help of the third bin. The second and the fourth bin are to check whether the optimisation procedure is run exactly or whether the threshold T should be changed because the distortion found is higher or lower than expected. The combined image signals, i.e. the function "out" available at the output connection of the function module 73 can be displayed and/or stored on the display and/or recording means 701.

Figure 8:
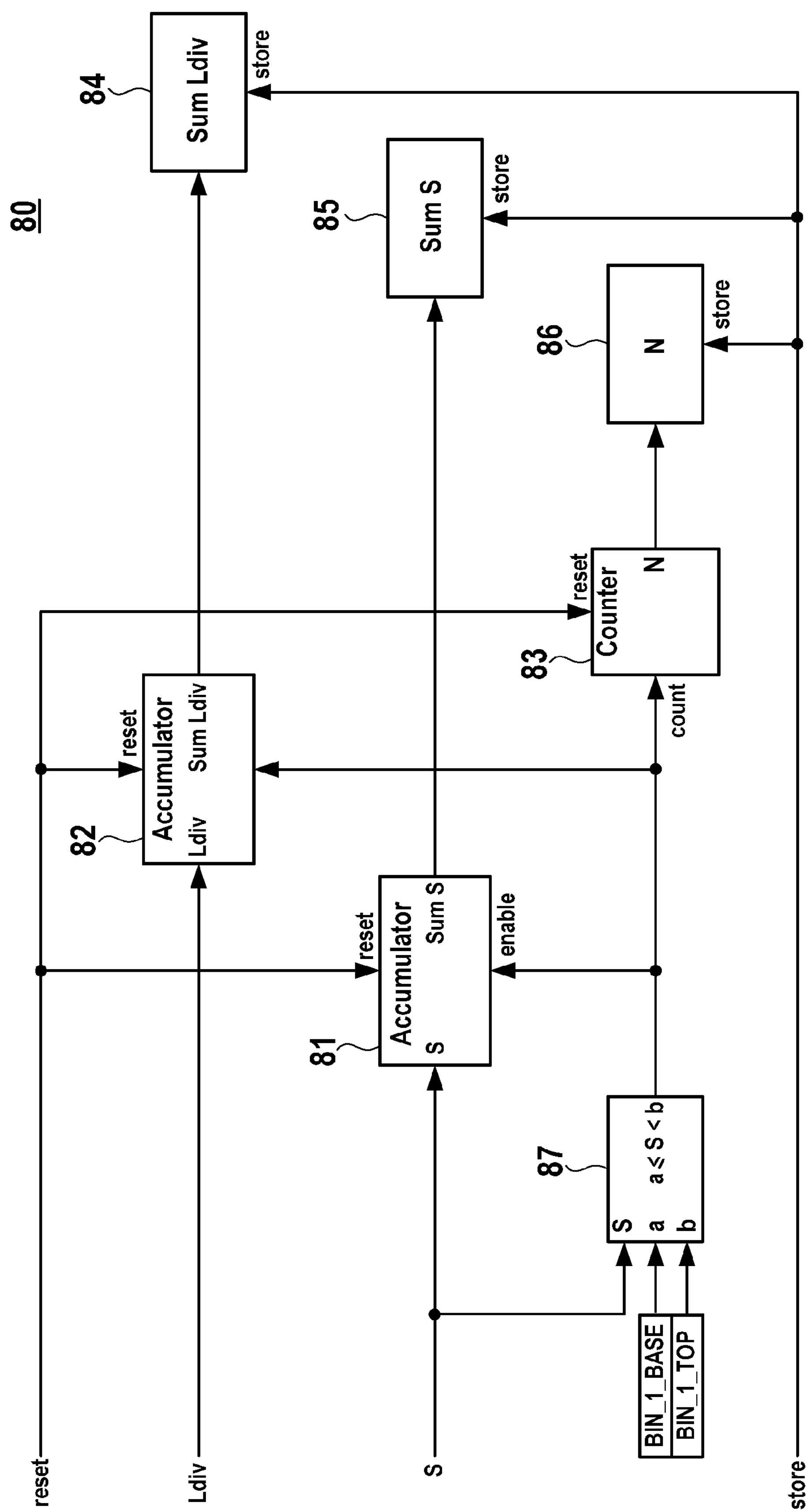
FIG. 8 is a more detailed block diagram of the image pickup apparatus shown in FIG. 7.

FIG. 8 is a more detailed block diagram 80 of a part of the image pickup apparatus 70 shown in FIG. 7 used for the measurement of Ldiv and S. The main idea of the invention is to combine the two signals mentioned above in a way creating the least possible distortion while maintaining the highest advantage possible. This is achieved by applying a non linear correction function. A suitable correction function could have any order and complexity. In the following example a second order function is chosen which, in most cases, leads to remarkably good results. There are four parts of this kind. In a very straightforward approach only two bins are used. 1 bin for Ldiv and 1 bin for S. The apparatus 70 comprises a first accumulator 81, a second accumulator 82, a counter 83, first storage means 84, second storage means 85, third storage means 86, and a function module 87. The measurement is performed as follows. At the beginning of a new frame the accumulators 81, 82, and the counter 83 are reset by a reset pulse applied to the reset connections via the reset lines. When the active video starts, the pixel value of the signal S is tested by the function module 87 to be $$\text{BIN\_1\_BASE} \leq S < \text{BIN\_1\_TOP(bin1)} \quad (9)$$

If true then the output of this function module 87 enables the accumulators 81, 82 to produce Sum Ldiv, Sum S, and increments the counter 83. At he end of a frame Sum Ldiv, Sum S, and Count are stored in storage means 84, 85, 83, respectively, and can be read out, for instance, by a microprocessor. At the beginning of a new frame the accumulators 81, 82, and the counter 83 are reset and the measurement can be repeated again. When the signal S is e.g. at 50% the deviation is supposed to be just a $1^{st}$ order deviation and therefore can be corrected by a first order term $k_1x^2$. If $k_1$ is chosen correctly then the results of Ldiv and S will be exactly the same. By applying $k_1$ the signal is corrected for the first order deviation over the whole signal range. Then the higher order deviations above the 50% point are approximated by the term $$k_2(x-p)^2|_{x>p} \quad (10)$$

When p is chosen to be 50% the term $k_2$ can be found by putting a second measurement bin slightly above this level. As k1 was already correct, now the bins for Ldiv and S will contain the same when $k_2$ is chosen correctly. The two remaining bins not used in this example may be used for checking and error detection instead. As a feed back loop is used for control in this example, the values for $k_1$ and $k_2$ can be adjusted with small steps in each frame, then measured again and converging towards a minimum difference of the result in the converging bins. This avoids complex calculations and is acceptable as long as the distortion is varying very slowly. The value of the counter 83 is used to check if the number of pixels used is significant enough. The only assumption in this very straightforward method described above is that there is a fair estimation for the value of p possible. If this is not feasible, more complex curve fitting algorithms requiring more computational work may be applied making use of all bins for measurement. In that case the value of the counter 83 is required to scale the result.

Figure 9:
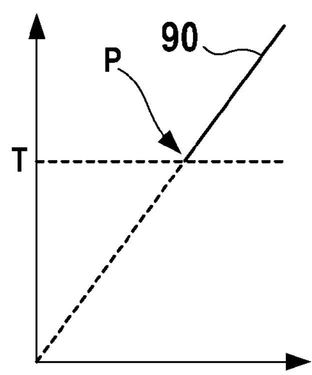
FIG. 9 is a line graph illustrating the matching at the crossover point with the invention applied.
Figure 10:
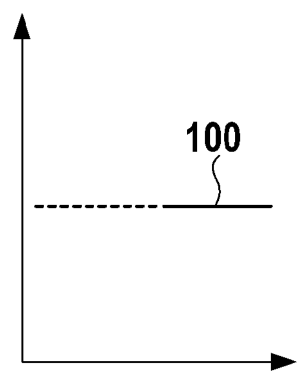
FIG. 10 is a line graph showing the first derivative of the graph shown in FIG. 9.

FIG. 9 shows a line graph 90 illustrating the matching at the crossover point with the invention applied. The graph shows an almost ideal matching while making use of the non linear correction function described above. The line graph 100 shown in FIG. 10 is a constant proving that the graph 90 shown in FIG. 9 is a linear function.

The invention claimed is:

1. An image pickup apparatus (70), comprising:

an image pickup means (sensor 700) for forming a plurality of image signals (S,L) having different exposure conditions, combining means for combining said plurality of image signals to form a combined image signal having an extended dynamic range, further comprising a function module (79) correcting at least one of the image signals (S,L) in order to achieve a smooth transition between the image signals (S, L) at a transition point (P), wherein the correction function executed in the function module (79) follows the equation $$y=x+k_xx^2+k_2(x-p)^2_{x}>_{P} \quad (6)$$

With:

x=input signal, y=output signal (corrected function), $k_xx^2$=term to compensate for the distortion in the CCD sensor due to the increasing charge, and $k_2\ (x-p)^2x>p$=term to compensate for the saturation of the output stage.

2. A method to process an image signal with large dynamic range, comprising the following steps:

a) forming a plurality of image signals having different exposure conditions with at least one image pickup sensor, b) correcting at least part of the plurality of image signals with a correction function in order to get a corrected output signal, b) combining said plurality of image signals and said corrected output signal to form a combined image signal having an extended dynamic range, wherein the correction function follows the equation $$y=x+k_x x^2+k_2(x-p)^2{}_{x>P} \quad (6)$$

With:

x=input signal, y=output signal (corrected function), $k_x x^2$=term to compensate for the distortion in a CCD sensor due to the increasing charge, and $k_2(x-p)^2 x>p$=term to compensate for the saturation of the output stage.

3. An image pickup apparatus (70), comprising:

an image pickup means (sensor 700) for forming a plurality of image signals (S,L) having different exposure conditions, combining means for combining said plurality of image signals to form a combined image signal having an extended dynamic range, further comprising a function module (79) correcting at least one of the image signals (S,L) in order to achieve a smooth transition between the image signals (S, L) at a transition point (P), wherein the correction function executed in the function module (79) takes into consideration compensation for distortion in the CCD sensor due to the increasing change and compensation for saturation of the output stage to yield a corrected output function.

4. The image pickup apparatus according to claim 1, wherein function modules (76.1, 76.2,77, 78) are provided, said function modules deriving parameters ($k_b$, $k_2$, p) from signal samples of the image signals (S,L) and feeding these parameters as correction factors into the function module (79).

5. The image pickup apparatus according to claim 4, wherein signal samples are taken from the image signals (S, L) available at the output of sensor (700).

6. The image pickup apparatus according to claim 1, wherein signal samples are taken from the image signal (S) available at the output of sensor (700), and from the image signal (Ldiv), wherein the signal (Ldiv) is derived from the output signal (L) of the sensor (700) by multiplying this signal (L) with a ratio (R) of the exposure conditions for the image signals (S, L).

7. The image pickup apparatus according to claim 1, wherein the sensor (700) is a CCD device (Charge Coupled Device).

8. The image pickup apparatus according to claim 1, comprising at least two accumulators (81, 82) wherein the first accumulator (81) generates an output (Sum S) from input (S), and wherein the second accumulator (82) generates an output (Sum Ldiv) from input (Ldiv), and further comprising a counter (83) generating an output (N).

9. The image pickup apparatus according to claim 1, comprising storage means (83, 84, 85) for storing the outputs (N, Sum S, Sum Ldiv) respectively.

10. The image pickup apparatus according to claim 1, further comprising display and/or recording means (701) for displaying and/or recording said combined image signal.

11. The method to process an image signal with large dynamic range according to claim 2, comprising the following steps:

a) forming first image signals with a short exposure time, b) forming second image signals with a long exposure time, c) correcting said second image signals formed with a long exposure time by applying a correction function to said second signals in order to provide third corrected signals, and d) combining the said first signals and the said third signals to form a combined image signal having an extended dynamic range.

12. The method to process an image signal with large dynamic range according to claim 11, wherein a ratio of the exposure times (R) is in the range between 4 and 32 times.

* * * * *